United States Patent
Quaschner et al.

(10) Patent No.: US 6,580,245 B2
(45) Date of Patent: Jun. 17, 2003

(54) JERK-LIMITATION WITH ADAPTATION OF THE PATH DYNAMICS

(75) Inventors: Bernd Quaschner, Grossenseebach (DE); Theo Reichel, Forshheim (DE); Elmar Schaefers, Nuremberg (DE); Wilhelm Westermeyer, Nuremberg (DE); Georg Wiegaertner, Pottenstein (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/929,392

(22) Filed: Aug. 14, 2001

(65) Prior Publication Data

US 2002/0074964 A1 Jun. 20, 2002

(30) Foreign Application Priority Data

Dec. 20, 2000  (DE) .......................... 100 63 722

(51) Int. Cl.$^7$ ................................ G05B 11/01
(52) U.S. Cl. ................ 318/560; 318/119; 318/565; 318/568.1; 318/568.11; 318/568.12; 318/568.13; 318/568.14; 318/568.15; 318/568.17; 318/568.18; 318/568.19

(58) Field of Search .............. 318/560, 119, 318/565, 568, 619, 561, 636

(56) References Cited

U.S. PATENT DOCUMENTS 5,832,188 A * 11/1998 Papiernik ................ 395/80
6,294,891 B1 * 9/2001 McConnell et al. ........ 318/619

* cited by examiner

Primary Examiner—Robert E. Nappi
Assistant Examiner—Renata McCloud
(74) Attorney, Agent, or Firm—Baker Botts LLP (57) ABSTRACT

A critical resonant frequency ($f_{res}$) of the axes of a moving machine element is damped as effectively as possible with the aid of a jerk limitation. Good damping in the case of a desired frequency is achieved when the longest possible time (TrLim) which can be traveled with a maximum permissible jerk (rLim) is selected such that 1/TrLim coincides with the lowest natural frequency ($f_{res}$) of the participating axes. This finding is implemented by adapting the path dynamics such that the TrLim=aMax/rLim yielded by the prescribed dynamics limiting values is varied by reducing the maximum jerk (rLim) to achieve good damping results for the lowest natural frequency ($f_{res}$) of the participating axes.

20 Claims, 6 Drawing Sheets

JERK-LIMITATION WITH ADAPTATION OF THE PATH DYNAMICS

FIELD OF THE INVENTION

The invention relates to a control method for jerk-limited velocity control of a moving machine element of a numerically controlled industrial processing machine such as a machine tool, a robot or the like, a trajectory of the machine element being resolved into directly sequential movement sections which can be interpolated, and to a corresponding numerical control.

BACKGROUND OF THE INVENTION

Jerk limitation currently forms part of the prior art for the velocity control of a numerical control, e.g. for a machine tool or a robot. The aim thereby is to achieve a lower loading of the individual axes of a machine without encountering grave disadvantages in the program processing time.

However, the smoothing action of jerk limitation depends strongly on the required desired value characteristic. Measurements and theoretical investigations have shown that higher-frequency acceleration processes and braking processes must be carried out with a relatively low level of dynamics in order not to excite the oscillating mechanics too strongly. This functional dependence holds both in the case of short positioning operations, and in path control operation.

At present, as a remedy for this problem, the limiting value for jerking and acceleration is set so low that even high-frequency changes in the tool path feedrate do not excite the oscillations too strongly. However, these low set dynamic values often undesirably prevent a higher tool path feedrate, and thus a shorter program processing time.

Figure 1:
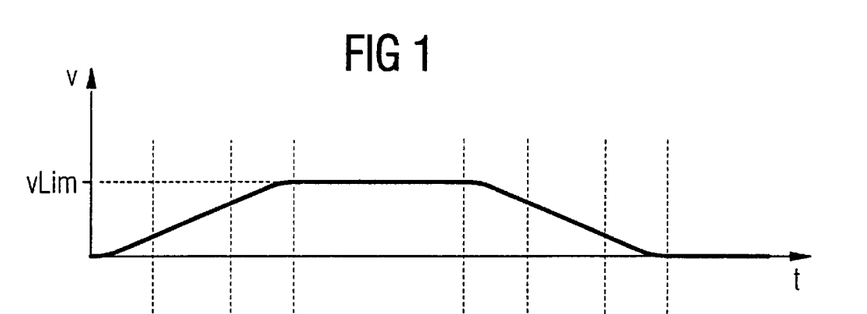
FIG. 1 shows the characteristic of the tool path feedrate against time for a conventional jerk limitation with the aid of a cubic polynomial.
Figure 2:
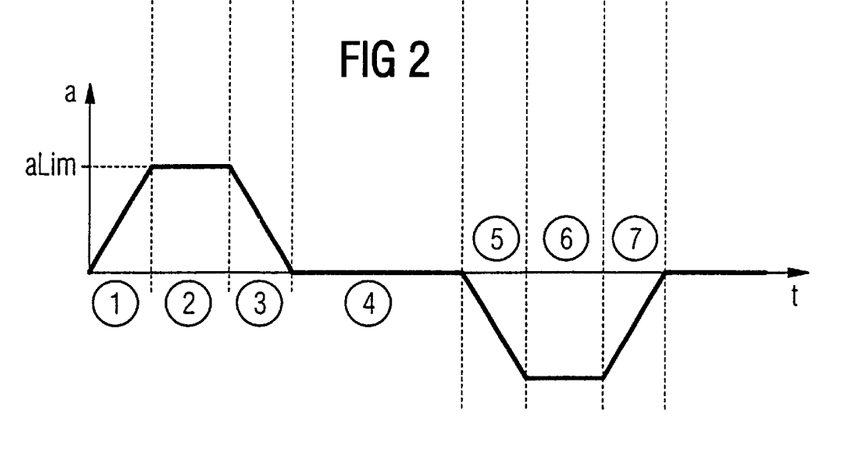
FIG. 2 shows the associated acceleration characteristic for a conventional jerk limitation with the aid of a cubic polynomial.

A known method for obtaining a machine-protecting velocity profile is jerk limitation with the aid of a cubic polynomial, as shown in FIG. 1 and FIG. 2 of the drawings. FIG. 1 shows the tool path feedrate V of a moving machine element against time t, whilst FIG. 2 shows the associated acceleration characteristic a. Traveling employs the maximum permissible acceleration aLim in phase 1. In phase 2, traveling employs constant further acceleration at aLim, the velocity continues to increase only linearly. The acceleration a is decreased in phase 3, that is to say braking is performed. The term acceleration as used below always includes the possibility of negative acceleration for braking purposes.

Consequently, at the end of phase 3, a maximum permissible tool path feedrate vLim is reached, which is then used for traveling in phase 4. In phases 5 to 7, the velocity v is now decreased analogously such that the tool path feedrate v is zero when the desired position is reached. For this purpose, a negative acceleration is built up in phase 5 and is kept constant in phase 6, finally being reduced again to zero in phase 7. The gradient of the acceleration in phases 1, 3, 5 and 7 is critical with reference to jerk limiting of a machine. In these phases, the velocity characteristic exhibits a polynomial variation, while the velocity varies linearly in the remaining phases.

This type of jerk limitation is distinguished chiefly in that it leads to only a slight lengthening of the program processing time by comparison with acceleration-limited velocity control. Even a shorter processing time is sometimes possible if a higher acceleration can be set at such a machine because of the jerk limitation.

However, it is problematical in this case that such highly dynamic acceleration and braking processes on the path can lead in a specific frequency range to excitation of mechanical vibrations. The dynamics of these processes should therefore be adapted to the machine conditions.

SUMMARY OF THE INVENTION

It is therefore the object of the present invention to create a possibility of using jerk limitation to dampen critical resonant frequencies of a machine or a moving machine element.

In accordance with the present invention, this object is achieved by means of a control method for jerk-limited velocity control of a moving machine element of a numerically controlled industrial processing machine such as a machine tool, a robot or the like, with a trajectory of the machine element being resolved into directly sequential movement sections which can be interpolated. This is achieved by virtue of the fact that acceleration processes with associated jerk profiles which result during interpolation and are situated at or in a region near a critical natural frequency of the machine element or of the machine, are adapted such that a time which is traveled with a maximum permissible jerk corresponds substantially to the reciprocal of this critical natural frequency.

The object of the invention is further achieved by means of numerical control for jerk-limited velocity control of a moving machine element of a numerically controlled industrial processing machine such as a machine tool, a robot or the like, an interpolator being provided for interpolating a trajectory of the machine element, resolved into directly sequential movement sections that can be interpolated by virtue of the fact that by means of jerk limitation such acceleration processes can be adapted with the associated jerk profiles, which result during interpolation and are situated at or in a region near a critical natural frequency of the machine element or of the machine, such that a time which is traveled with a maximum permissible jerk corresponds substantially to the reciprocal of this critical natural frequency.

It has proved to be favorable in this case both for the control method and for the numerical control when jerk profiles resulting during interpolation and having a characteristic situated at or in a region near a critical natural frequency of the machine element or of the machine are determined with the aid of a velocity characteristic, determined modally in advance over a plurality of movement sections that can be interpolated, of the machine element on the trajectory thereof.

An adaptation of determined critical acceleration processes can be achieved in a particularly simple and therefore advantageous way by varying, in particular reducing, the maximum permissible jerk until the jerk time corresponds substantially to the reciprocal of this critical natural frequency.

Where a factor is prescribed with the aid of which the maximum permissible jerk is reduced as much as possible, it is possible to avoid an unnecessary reduction in the path dynamics.

An advantageous refinement of the device and of the control method of the present invention uses the minimum of the natural frequencies of all the axes participating in the trajectory of the machine element as critical natural frequency.

According to an alternative refinement, a mean value of the natural frequencies of all the axes participating in the trajectory of the machine element serves as critical natural frequency.

A further alternative embodiment is distinguished in that the critical natural frequency is produced by weighting the natural frequencies of all the axes participating in the trajectory of the machine element, weighting advantageously being performed with the aid of the contribution of a respective participating axis to the trajectory of the machine element.

When a separate adaptation of critical acceleration processes is performed for each participating axis, an axial jerk profile being analyzed by analyzing the axial velocity characteristic resulting for an assumed constant tool path feedrate of the machine element, it is also possible to take account of contour curvatures or transformations of a trajectory.

It has proved to be advantageous in this case when axial jerk profiles resulting during interpolation and having a characteristic situated at or in a region near a critical natural frequency on the relevant axis are determined modally in advance by section, a section being formed respectively by minima or maxima of the axial velocity characteristic.

This is performed according to a further advantageous refinement by virtue of the fact that in order to adapt determined critical acceleration processes the maximum tool path feedrate is reduced for each analyzed section of the axial velocity characteristic until the jerk time corresponds substantially to the reciprocal of the critical natural frequency of the respective axis.

A further improvement can be achieved when even the longest possible time over which it is possible to travel at maximum acceleration, and/or over which it is possible to travel at maximum velocity is adapted to the same frequency as the jerk time or a multiple thereof.

It has proved in this case to be advantageous for the numerical control according to the invention when the jerk limitation is configured as a linearized digital filter which supplies an associated desired jerk value at each operating point of the machine element.

The high-frequency changes in the tool path feedrate are carried out automatically with the aid of smaller jerk or acceleration values by using the above-described adapting of the dynamics in accordance with the present invention. This additionally permits the dynamics limiting values to be increased, thereby permitting a gain in the program processing time to be obtained.

BRIEF DESCRIPTION OF THE DRAWINGS

The mode of operation of the adaptation of the tool path feedrate, and further advantages and details are explained below with the aid of a plurality of exemplary embodiments and in conjunction with the accompanying drawings in which.

DETAILED DESCRIPTION OF THE INVENTION

Figure 3:
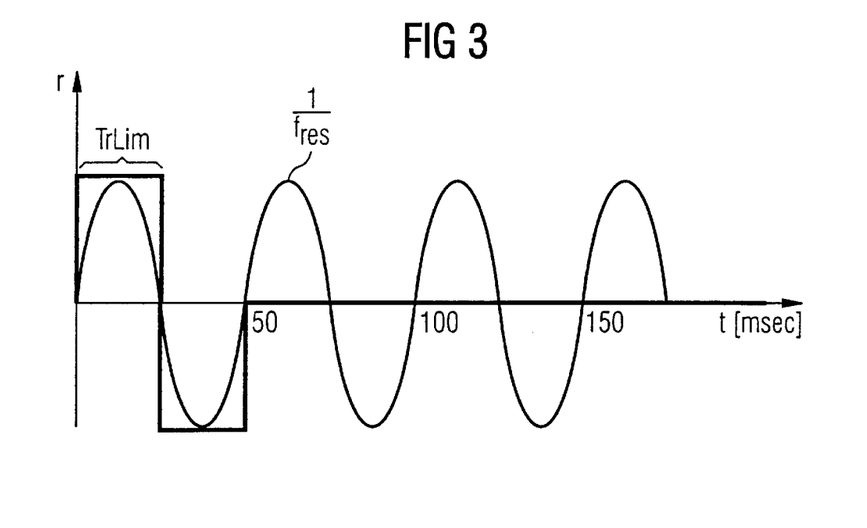
FIG. 3 shows an unfavorable jerk characteristic with excitation of a resonant frequency of 20 Hz.
Figure 4:
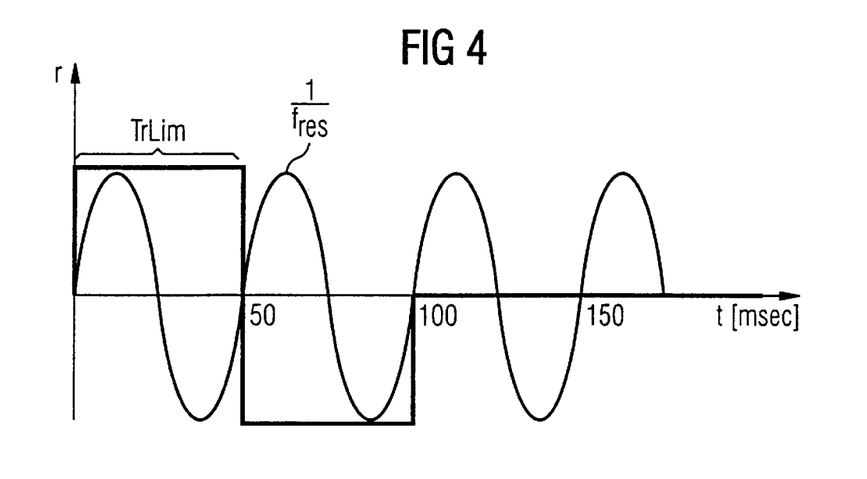
FIG. 4 shows a favorable jerk characteristic for a resonant frequency of 20 Hz.

Illustrated respectively against time t in the two representations according to FIG. 3 and FIG. 4 is an oscillation at 20 Hz which represents a resonant frequency $f_{res}$ associated with a moving machine element. In addition, a jerk characteristic r which strongly excites this oscillation is illustrated in FIG. 3. In this case, the jerk characteristic coincides exactly with a half wave of the sinusoidal oscillation.

By contrast, FIG. 4 illustrates a jerk characteristic r such as is targeted with the adaptation of the path dynamics and which damps a critical resonant frequency $f_{res}$ (20 Hz) as effectively as possible, the jerk characteristic r coinciding with a full oscillation period $1/f_{res}$. This is the case when the maximum permissible time TrLim over which it is possible to travel with a maximum jerk rLim corresponds to the period of the resonant frequency $f_{res}$.

It will now be shown below how, in accordance with the present invention, such a favorable jerk characteristic according to FIG. 4 can be achieved. The fundamental consideration in this case is for all path jerk characteristics with a frequency higher than illustrated in FIG. 4 to be adapted to the ideal case of FIG. 4 as closely as possible by reducing the jerk limiting value.

The jerk limitation is regarded for this purpose as a linearized filter in the following description. At a specific operating point, which is given by the prescribed dynamic values (jerk, acceleration, velocity) and the desired path, it is possible in this way to calculate from these stipulations the maximum permissible time TrLim over which it is possible to travel with a maximum jerk rLim. The same holds for the maximum permissible time TaLim over which it is possible to travel with maximum acceleration aLim, and the maximum permissible time TvLim over which it is possible to travel with a maximum tool path feedrate vLim.

Figure 5:
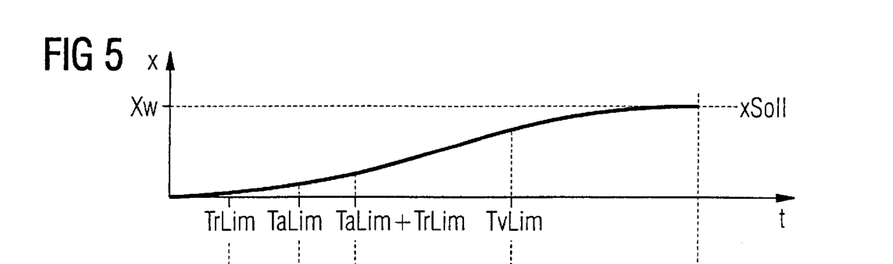
FIG. 5 shows a path characteristic against time leading to traveling into a desired position.
Figure 6:
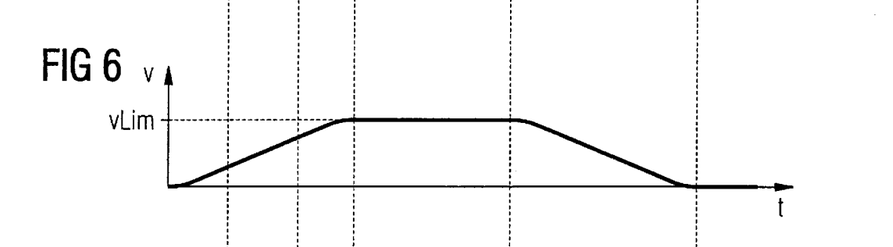
FIG. 6 shows a characteristic of the tool path feedrate against time for the path characteristic of FIG. 5.
Figure 7:
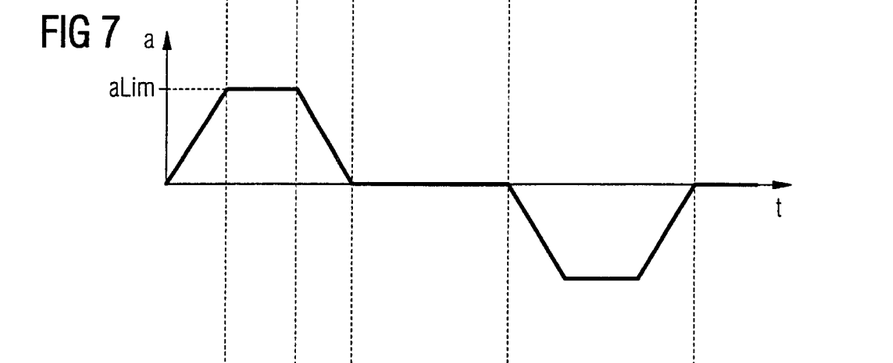
FIG. 7 shows an acceleration characteristic against time for the tool path feedrate of FIG. 6.
Figure 8:
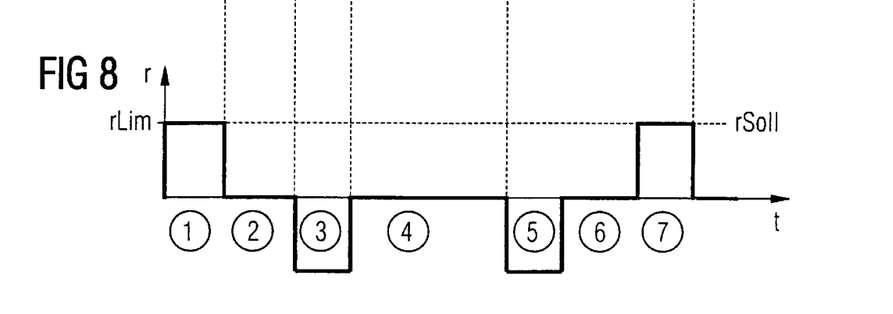
FIG. 8 shows a jerk characteristic against time for the characteristics of FIGS. 5 to 7.

The geometrical and mathematical relationship between these values is illustrated in FIGS. 5 to 8. Here, FIG. 5 shows the trajectory x against time t for traveling over a distance Xw into a desired position xSoll. FIG. 6 shows the associated resulting characteristic v of the tool path feedrate, FIG. 7 the resulting acceleration profile a, and FIG. 8 the jerk characteristic r, associated therewith, against time t in each case. The limiting value vLim is observed for the path velocity v, the limiting value aLim for the acceleration a, and the limiting value rLim for the jerk. The profile is dimensioned such that the desired positioned xSoll is reached as quickly as possible by satisfying all these limiting values. In addition, the already defined times TrLim, TaLim and TvLim are plotted, as is a desired jerk value rSoll.

The course of the movement is subdivided into the equal phases 1 to 7, which have already been explained in connection with FIG. 1 and FIG. 2. Here, TrLim corresponds to the duration of phase.1, TaLim to the duration of phases 1+2, and TvLim to the duration of phases 1–4.

An overall transmission function is yielded in this case according to the following calculating rule:

$$(1)\ \text{xSoll} = \text{Xw} * \frac{(1-e^{-s\text{TrLim}})/(s*\text{TrLim})*}{(1-e^{-s\text{TaLim}})/(s*\text{TaLim})*}$$
$$(1-e^{-s\text{TrLim}})/(s*\text{TrLim})*$$

where Xw=rSoll*TrLim*TaLim*TvLim

Accordingly, to a first approximation the transmission function of the jerk limitation can be assumed to be $$(1-e^{-sTrLim})/(s*\text{TrLim}) \qquad (2)$$

This would be correct if TaLim and TvLim were not varied by the jerk limitation, for example since a higher maximum acceleration is now possible. The times TrLim, TaLim and TvLim depend on rLim, aLim, vLim and on the initial and final conditions for position and velocity.

The aim is now for the critical resonant frequency $f_{res}$ of the axes to damp as effectively as possible with the aid of the jerk limitation. For this purpose, the transmission function $(1-e^{-sTrLim})/(s*\text{TrLim})$ is examined more accurately by determining the amplitude spectrum.

The amplitude response is calculated as:

$$|F(f)|=|\sin(\pi*f*\text{TrLim})/(\pi*f*\text{TrLim})| \qquad (3)$$

Figure 9:
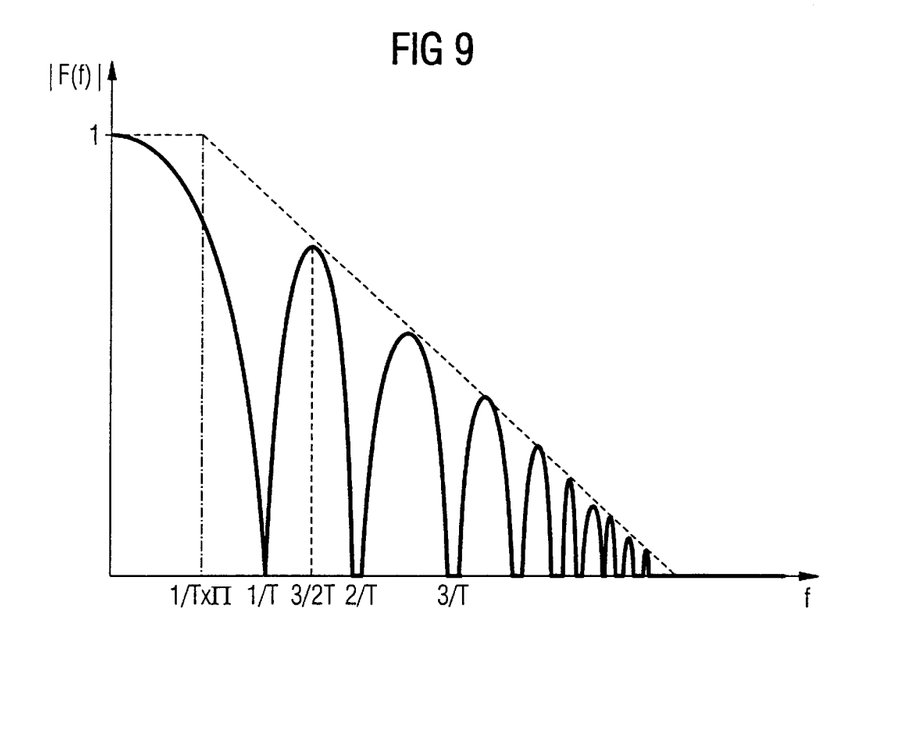
FIG. 9 shows a frequency response of the jerk limitation according to the invention as a linearized filter.

FIG. 9 is a sketch of the amplitude response of the jerk limitation as a linearized filter, assuming that T=TrLim.

It is obvious from this to the person skilled in the art that very good damping is obtained at a desired frequency when TrLim can be selected such that 1/TrLim coincides with the lowest natural frequency $f_{res}$ of the participating axes. The present invention utilizes this finding by adapting the path dynamics.

For this purpose, the velocity characteristic on the path is calculated modally in advance. This is achieved by means of what is termed a LookAhead function.

LookAhead is a method in path control operation which can determine a velocity control going beyond the current block for a plurality of numerical control (NC) part program blocks. If the programmed blocks contain only very small path distances, without LookAhead, a velocity is reached per block which permits the axes to be braked at the terminal block point while observing the acceleration limits. This means that the programmed velocity is not reached at all, although there are a satisfactory number of conditioning blocks with virtually tangential path transitions. It is possible using the function LookAhead in conjunction with approximately tangential path transitions to implement the acceleration and braking phase over a plurality of blocks, and thus to achieve a higher feedrate in conjunction with short distances. Braking is carried out looking ahead at the velocity limitations so as to avoid violating the acceleration limits and the velocity limits.

LookAhead undertakes block-by-block analysis of the velocity limitations that can be planned and accordingly fixes the required bridge ramp profiles. LookAhead is adapted automatically to block length, braking power and permissible tool path feedrate. The velocity characteristic on the path is determined modally in advance in this way.

The TrLim=aMax/rLim resulting from the prescribed dynamics limiting values is now preferably varied by reducing the maximum jerk rLim so as to produce good damping for the lowest natural frequency of the participating axes.

Figure 10:
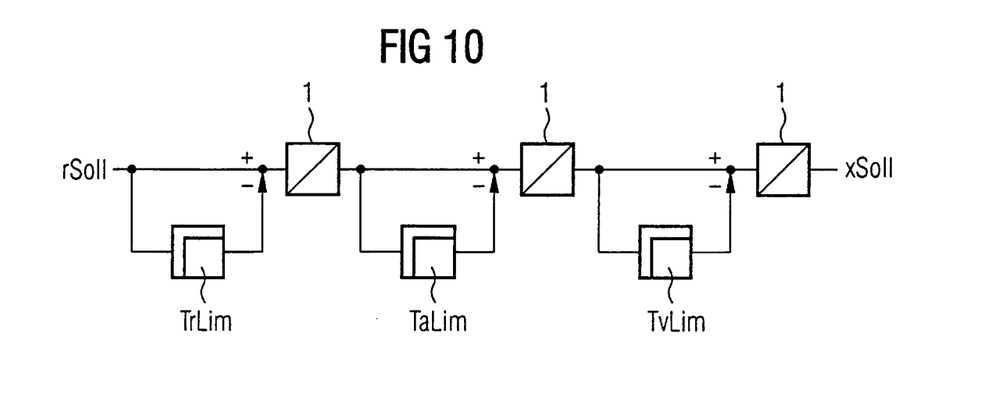
FIG. 10 shows a signal flow diagram of the linear filter of FIG. 9.

FIG. 10 shows the signal flow diagram, belonging to FIGS. 5 to 8, of a jerk limitation, understood as a linearized digital filter, which can be implemented, for example, in a numerical control by means of a microprocessor or microcontroller.

However, it has been found that it may not be advantageous for every acceleration process or braking operation to observe this condition of a jerk time of TrLim=1/$f_{res}$. The damping of the linearized "jerk filter" admittedly only obtains then, but in the case of small step-changes in desired value the excitation, that is to say the input variable Xw, is also very much smaller, and therefore overswinging owing to oscillating mechanics likewise becomes smaller. Consequently, it is advantageous to prescribe a factor with the aid of which the jerk is reduced as much as possible, in order to have to accept a dynamic loss which is as low as possible.

It is also possible, furthermore, for TaLim and TvLim to be at the same frequency, or to achieve this frequency with 2/T or another multiple. This amplifies the damping at this one frequency, but it is necessary in this case to take account of possible effects on the resonant frequencies of the other axes (assuming that the lowest natural frequency $f_{res}$ of all the axes participating in a movement of a machine element is damped).

This can be achieved when the maximum acceleration and the maximum velocity are not reached, or when these are raised within the permissible framework. It then holds in accordance with the diagrams shown in FIGS. 5 to 8 that:

$$\text{TaLim=TrLim and TvLim=TaLim+TrLim=2*TrLim} \qquad (4)$$

In order to achieve the damping effect at a specific frequency, it can sometimes be sensible to increase the jerk limiting value (f>1/TrLim). However, in this case it is necessary in turn to attend to the effects for a plurality of axes whose resonant frequencies differ. The damping owing to the envelope according to FIG. 4 should already be satisfactorily high at frequencies of greater than 1/TrLim (that is to say, of f>1/TrLim). The parameterization of the jerk limiting value should be designed on this basis.

For one thing, the minimum of the resonant frequencies $f_{res}$ of all the axes participating on the path can be used to assess TrLim in order to optimize the desired stop frequency. However, a mean value of all the participating axes is more favorable overall in the case of relatively similar resonant frequencies. Secondly, a critical resonant frequency $f_{res}$ on the path can be determined by weighting the resonant frequencies of all the participating axes, account also being taken of the contribution of the respective axis to the path.

A further optimization consists in avoiding secondary maxima. Acceleration processes and braking operations with TrLim from are also brought to a TrLim with higher damping by varying the jerk. It is thereby possible to reach higher jerk values in conjunction with the same damping, since the effect of the envelope decreases strongly. However, it is still necessary then to take account of the effects in the case of different resonant frequencies of the axes participating on the path, as well as the effects of the contour.

The finction described so far takes account only of the changes in the tool path feedrate, but not the axial jerk characteristics, which follow from the contour curvature. This problem can be explained most simply in the case of a circular path.

Given a constant tool path feedrate, the two axes participating in a circular contour have a sinusoidal characteristic with the frequency $f=v/(2*r*\pi)$ as regards position, velocity, acceleration and also jerk. If this frequency is in the region of the resonant frequency $f_{res}$ of the axis, the latter is strongly excited.

In order to avoid such overloading of the axis, the maximum jerk and the maximum acceleration for this axis are limited, for example, for the desired contour shape. If this jerk cannot be observed, the tool path feedrate is lowered.

The consideration of the maximum value can also be supplemented here by considering the resulting time characteristics. This is possible with relative ease in the case of a circle, by searching, as already in the case of a known function for path smoothing, for minima and maxima of the velocity, and comparing this time with the resonant frequency. If a critical frequency is detected, the tool path feedrate is lowered.

The procedure is as follows for arbitrary polynomials. The present velocity characteristic of the individual axes is analyzed section by section for an assumed constant tool path feedrate. The limits of the individual sections are the instants at which there are no minima or maxima of the velocity. A maximum tool path feedrate with which the velocity profile exhibits no excitations, or only slight ones, at the resonant frequency of the relevant axis is then prescribed for these sections.

In the case of such an analysis, very high-frequency components, which have proved to be relatively uncritical in investigations to date using the invention, often occur. These components can therefore be ignored completely in the extreme case. The following further possibilities exist as alternatives:

the characteristic under investigation is generally smoothed, and thereafter investigated for maxima and minima, or the high-frequency components are investigated as to their effects (account being taken of the amplitude, area criteria).

From the point of view of the tool path feedrate, transformations also behave identically to axial characteristics on the basis of the contour curvature. Here, as well, given a constant tool path feedrate, axial braking operations and acceleration processes occur which can be limited only to maximum values in accordance with the prior art. The above solution to the problem likewise provides a remedy here.

What has been said above is now to be illustrated with the aid of two exemplary situations. To simplify the illustration, the use of the invention is shown in FIGS. 11–14 without jerk limitation, only with acceleration limitation. The modal way that the invention works can be more easily illustrated thereby. The time which is optimized thereby is now TaLim instead of TrLim.

Figure 11:
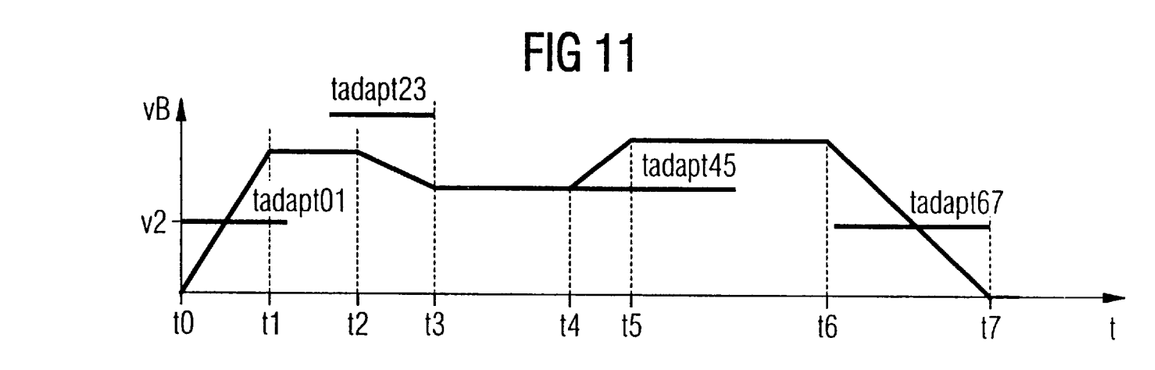
FIG. 11 shows a first example of a time-optimized characteristic of the tool path feedrate, without adaptation of the path dynamics.

FIG. 11 shows for this purpose a first example of a time-optimal, acceleration-limited tool path feedrate characteristic without adaptation of the path dynamics. The variation in the tool path feedrate vB with the velocity value v2 is plotted against time t and has instants t0 to t7 at which the characteristic of vB respectively changes.

The following parameters are also used as a basis for this example:

Factor by which the acceleration is produced at most: 1.5

Resonant frequency of the 1st participating axis AX1: 20 Hz

Resonant frequency of the 2nd participating axis AX2: 10 Hz

Resonant frequency of the 3rd participating axis AX3: 20 Hz

In the case of path movements in which the axis AX2 participates, all braking operations and acceleration processes which take at most a time of $\frac{1}{10}$ Hz=100 ms are adapted. If only the axes AX1 or AX3 participate, all the braking operations and acceleration processes which take at most a time of $\frac{1}{20}$ Hz=50 ms are adpated. This time is denoted as "tadapt xy" in FIGS. 11 and 12.

Figure 12:
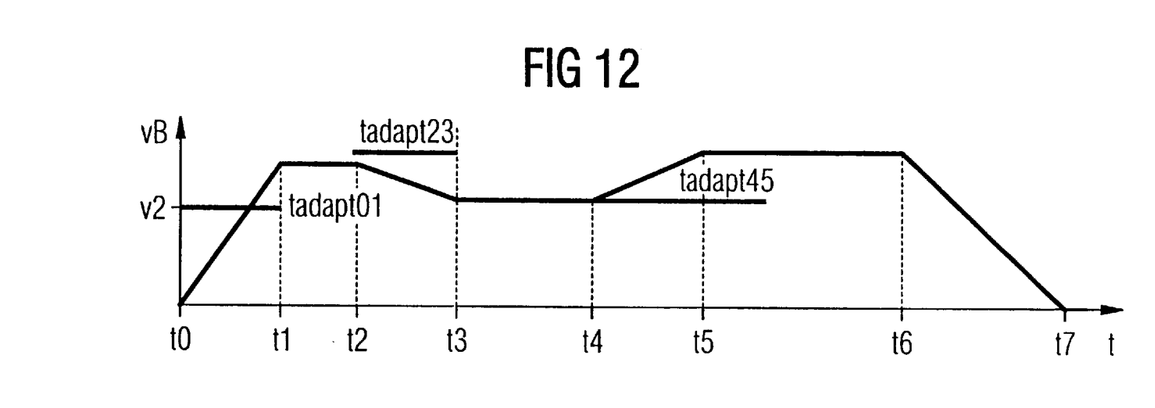
FIG. 12 shows the corresponding characteristic of the tool path feedrate, with adaptation of the path dynamics according to the invention.

FIG. 12 now shows the tool path feedrate characteristic resulting from FIG. 11 in the case of adaptation of the dynamics in accordance with the invention. The acceleration process between the instants t0 and t1, and the braking operation between t2 and t3 are "stretched" to the time tadapt01 and tadapt23, respectively, by adapting the acceleration.

The acceleration process between t4 and t4 is carried out with an acceleration reduced by a factor 1.5, as parameterized by the above named factor. Nevertheless, the acceleration process is terminated before the time tadapt45. The braking operation between t6 and t7 remains unchanged, since it lasts longer than tadapt67.

Figure 13:
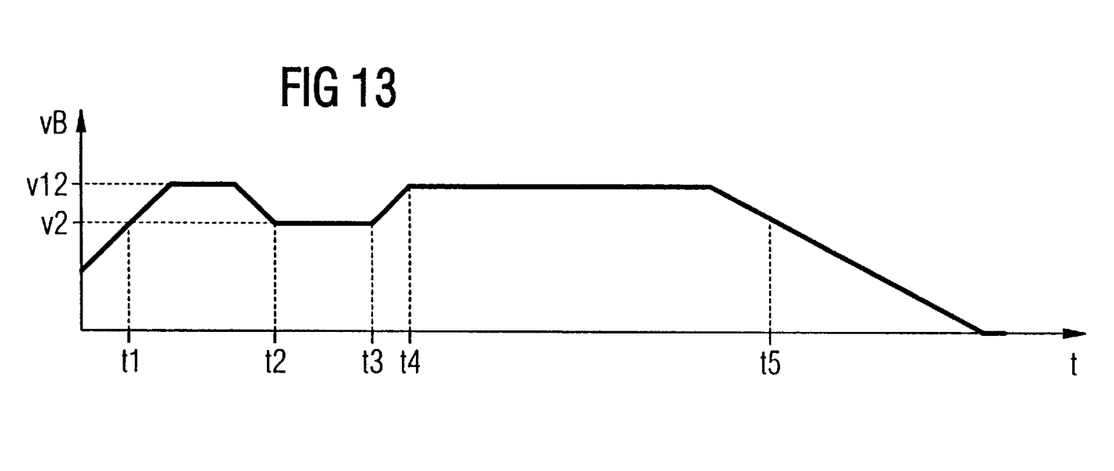
FIG. 13 shows a second example of a time-optimized characteristic of the tool path feedrate, without adaptation of the path dynamics.
Figure 14:
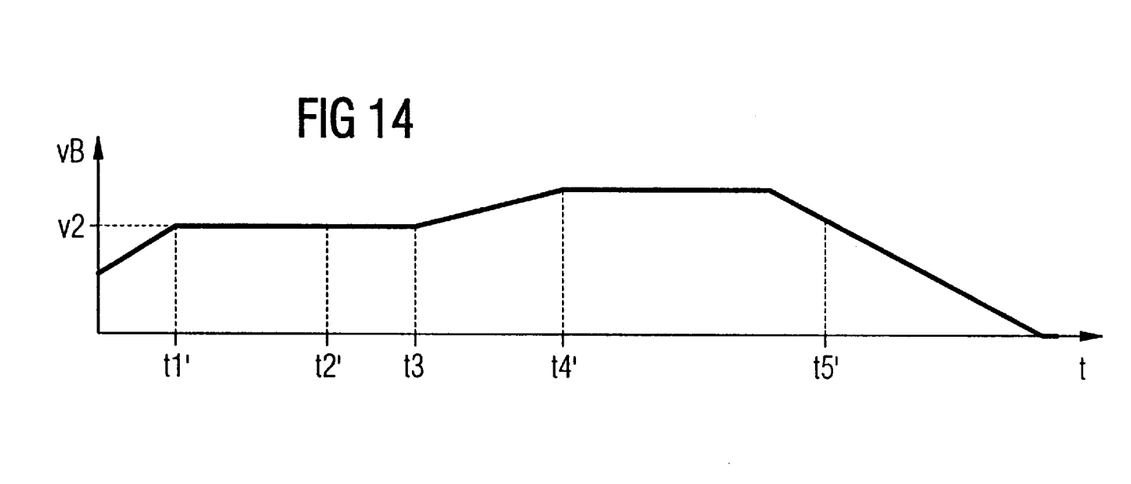
FIG. 14 shows the corresponding characteristic of the tool path feedrate with adaptation of the path dynamics according to the invention and additional path smoothing.

FIG. 13 and 14 show a further example, but with a further advantageous combination of adaptation of the path dynamics according to the invention in conjunction with smoothing of the tool path feedrate. In this case, FIG. 13 shows a time-optimal, acceleration-limited tool path feedrate characteristic with the velocities v2 and v12 without adaptation of the path dynamics, likewise with instants t0 to t7.

The basic parameters in this case are:

Path smoothing factor: 80%

Factor by which the acceleration is reduced at most: 3

Resonant frequency of the 1st participating axis AX1: 20 Hz

Resonant frequency of the 2nd participating axis AX2: 20 Hz

Resonant frequency of the 3rd participating axis AX3: 20 Hz

The illustration according to FIG. 14 shows the resulting tool path feedrate characteristic with adaptation according to the invention of the path dynamics and additional path smoothing. The entire acceleration and braking characteristic between t1 and t2 is now eliminated, since the lengthening of the processing time without the acceleration process to v12 is less than 80%.

The overall acceleration and braking characteristic between t3 and t4 does not fulfill this condition, or lasts longer than parameterized (here: $\frac{2}{20}$ Hz=100 ms). The acceleration process from t3 to t4 is shorter than 50 ms ($=\frac{1}{20}$ Hz) and is therefore carried out with an acceleration which is less by the factor 3.

The acceleration process up to t1, remaining after path smoothing, is extended up to the time period up to t1' by the adaptation of the path dynamics.

This example makes it clear why it can be advantageous to use the adaptation of the path dynamics in path control operations as far as possible together with the path smoothing. Only the acceleration processes or braking operations on the path which have not yet been eliminated by the path smoothing therefore need still be optimized for the respective machine.

We claim:

1. A method for controlling the jerk limited velocity of a moving element of a numerically controlled machine, said element having a trajectory which is resolved into directly sequential interpolatable movement sections, comprising the steps of:

determining a critical natural frequency of the machine element or machine at which the acceleration processes with associated jerk processes which result during the interpolation are situated;

adapting said acceleration processes such that a time which is traveled with a maximum permissible jerk corresponds substantially to the reciprocal of said critical natural frequency; and     wherein a minimum of natural frequencies of all axes of the trajectory of the machine element serve as the critical natural frequency.

2. The control method according to claim 1, wherein a mean value of the natural frequencies of all the axes of the trajectory of the machine element serve as critical natural frequency.

3. The control method according to claim 1, wherein the critical natural frequency is produced by weighting the natural frequencies of all the axes of the trajectory of the machine element.

4. The control method according to claim 3, wherein weighting is performed using a respective axis of the trajectory of the machine element.

5. The control method according to claim 1, wherein a separate adaptation of the critical acceleration processes is performed for each axis, an axial jerk profile being analyzed by analyzing an axial velocity characteristic resulting for an assumed constant tool path feedrate of the machine element.

6. The control method for jerk-limited velocity control of a moving machine element according to claim 5, wherein axial jerk profiles resulting during interpolation and having a characteristic situated at or in a region near a critical natural frequency of the relevant axis are determined modally in advance by section, a section being formed respectively by minima or maxima of the axial velocity characteristic.

7. The control method for jerk-limited velocity control of a moving machine element according to claim 5, wherein in order to adapt determined critical acceleration processes the maximum tool path feedrate is reduced for each analyzed section of the axial velocity characteristic until the jerk time corresponds substantially to the reciprocal of the critical natural frequency of the respective axis.

8. The control method for jerk-limited velocity control of a moving machine element according to claim 7, wherein even the longest possible time over which it is possible to travel at maximum acceleration, and/or over which it is possible to travel at maximum velocity is adapted to the same frequency as the jerk time or a multiple thereof.

9. The control method according to claim 1, wherein jerk profiles resulting during interpolation and having a characteristic situated at or in a region near a critical natural frequency are determined by jerk limitation using a velocity characteristic determined modally in advance over a plurality of movement sections that are interpolated from the trajectory of the machine element; and wherein in order to adapt a determined critical acceleration process, the jerk limitation varies the maximum permissible jerk until a jerk time corresponds substantially to a reciprocal of the critical natural frequency.

10. The numerical control system for jerk-limited velocity control of a moving machine element according to claim 9, wherein the jerk limitation prescribes a factor with the aid of which the maximum permissible jerk is reduced as much as possible.

11. The numerical control system for jerk-limited velocity control of a moving machine element as claimed according to claim 9, wherein the jerk limitation uses as critical natural frequency the minimum of the natural frequencies of all the axes participating in the trajectory of the machine element.

12. The numerical control system for jerk-limited velocity control of a moving machine element according to claim 10, wherein the jerk limitation uses as critical natural frequency a mean value of the natural frequencies of all the axes participating in the trajectory of the machine element.

13. The numerical control system for jerk-limited velocity control of a moving machine element according to claim 10, wherein the jerk limitation comprises means for weighting the natural frequencies of all the axes participating in the trajectory of the machine element.

14. The numerical control system for jerk-limited velocity control of a moving machine element according to claim 13, wherein the jerk limitation undertakes weighting with the aid of the contribution of a respective participating axis to the trajectory of the machine element.

15. The control method according to claim 1, wherein jerk profiles resulting during interpolation and having a characteristic situated at or in a region near a critical natural frequency are determined using a velocity characteristic determined modally in advance over a plurality of movement sections that can be interpolated from the trajectory from the trajectory of the machine element, and wherein a separate adaptation of critical acceleration processes are carried out by the jerk limitation for each participating axis, an axial jerk profile being obtained by analyzing a resulting axial velocity characteristic for an assumed constant tool path feedrate of the machine element.

16. The numerical control system for jerk-limited velocity control of a moving machine element according to claim 15, wherein axial jerk profiles resulting from the jerk limitation and having a characteristic situated at or in a region near a critical natural frequency of the respective axis can be determined modally in advance by section, a section being formed respectively by minima or maxima of the axial velocity characteristic.

17. The numerical control system for jerk-limited velocity control of a moving machine element according to claim 15, wherein in order to adapt determined critical acceleration processes the maximum tool path feedrate can be reduced by the jerk limitation for each analyzed section of the axial velocity characteristic until the jerk time corresponds substantially to the reciprocal of the critical natural frequency of the respective axis.

18. The numerical control system for jerk-limited velocity control of a moving machine element according to claim 17, wherein even the longest possible time with which it is possible to travel at maximum acceleration and/or with which it is possible to travel at maximum velocity can be adapted by the jerk limitation to the same frequency as the jerk time or a multiple thereof.

19. The numerical control system for jerk-limited velocity control of a moving machine element according to claim 18, wherein the jerk limitation is configured as a linearized digital filter which supplies an associated desired jerk value at each operating point of the machine element.

20. The control system according to claim 9, wherein the jerk limitation reduces the maximum possible jerk.

* * * * *